(12) United States Patent  (10) Patent No.: US 6,186,475 B1
Selepouchin  (45) Date of Patent: Feb. 13, 2001

(54) SPIGOT HANDLE EXTENDER

(76) Inventor: Vladimir Selepouchin, 151 Harper Ter., Cedar Grove, NJ (US) 07009-2229

( * ) Notice: Under 35 U.S.C. 154(b), the term of this patent shall be extended for 0 days.

(21) Appl. No.: 09/291,486

(22) Filed: Apr. 14, 1999

(51) Int. Cl.⁷ .................................................. F16K 31/60
(52) U.S. Cl. ............................... 251/293; 16/427; 16/432
(58) Field of Search .............................. 251/293; 16/432, 16/427, 422

(56) References Cited

U.S. PATENT DOCUMENTS

| | | | |
|---|---|---|---|
| 1,170,138 | * | 2/1916 | Buhne et al. ..................... 251/293 X |
| 1,181,565 | * | 5/1916 | Block ............................... 251/293 X |
| 1,267,545 | * | 5/1918 | Haynie ............................. 251/293 X |
| 1,311,889 | * | 8/1919 | Hartdorn .......................... 251/293 X |
| 1,437,156 | * | 11/1922 | Schumacher .......................... 251/293 |
| 1,573,287 | * | 2/1926 | Williams, Jr. et al. .............. 251/293 |
| 1,827,861 | * | 10/1931 | Volkhardt ............................ 251/293 |
| 1,980,087 | | 11/1934 | Rast . |
| 3,598,361 | * | 8/1971 | Crowe .............................. 251/203 X |
| 4,131,133 | | 12/1978 | Huwe . |
| 4,266,320 | | 5/1981 | Grant . |
| 4,429,855 | | 2/1984 | Buffone . |
| 4,629,157 | | 12/1986 | Tsuchiya et al. . |
| 4,665,386 | | 5/1987 | Haws . |
| 4,699,020 | | 10/1987 | Bush et al. . |
| 4,706,598 | | 11/1987 | Jeffress . |
| 4,876,766 | | 10/1989 | Cohen . |
| 5,025,826 | | 6/1991 | Schoepe et al. . |
| 5,257,771 | * | 11/1993 | Portis et al. .......................... 251/293 |
| 5,340,078 | * | 8/1994 | Dean ................................. 251/293 X |
| 5,511,286 | | 4/1996 | Williams et al. . |
| 5,711,511 | | 1/1998 | Cynar . |
| 5,746,416 | * | 5/1998 | Paylor .............................. 251/293 X |

* cited by examiner

Primary Examiner—John Rivell
(74) Attorney, Agent, or Firm—Selitto & Associates

(57) ABSTRACT

A spigot handle extender, an apparatus for extending a valve handle, includes a rotatable body and engaging means for engaging a valve handle so as to be rotatable conjointly therewith. The engaging means is positioned within the body and is also rotatable conjointly with the body, so that the engaging means rotates an engaged valve handle in response to the rotation of the body. In a preferred embodiment, the body is formed by identical hermaphroditic body halves. The body includes a pair of attached opposing wings, a plurality of slots, and a central bore. The engaging means is an engager which includes abase with an opening, a plurality of bosses projecting from one side, and a plurality of fingers projecting from the opposite side. The bosses on the base fit engagingly into the slots within the body and the fingers on the base fit engagingly between the spokes of the valve handle when the engager and valve handle are enclosed within the body. The central bore through the body aligns with the opening in the base to allow access to any fastener connecting the valve handle to the valve, allowing removal and replacement of the body and an engaged valve handle as a unit. The body can accommodate interchangeable engagers configured to grip various styles of valve handles, particularly residential spigot handles.

38 Claims, 13 Drawing Sheets

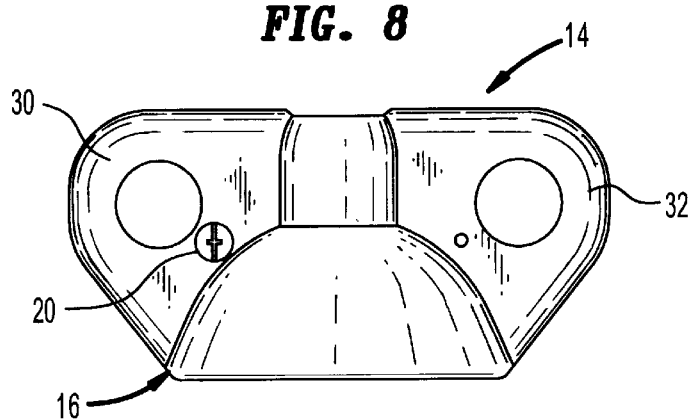
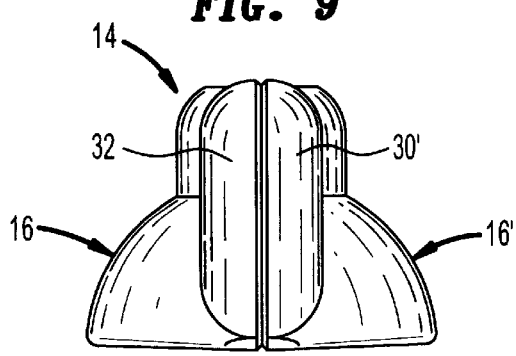
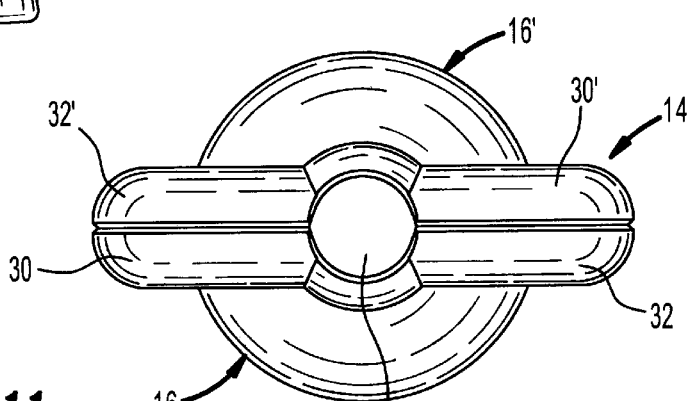
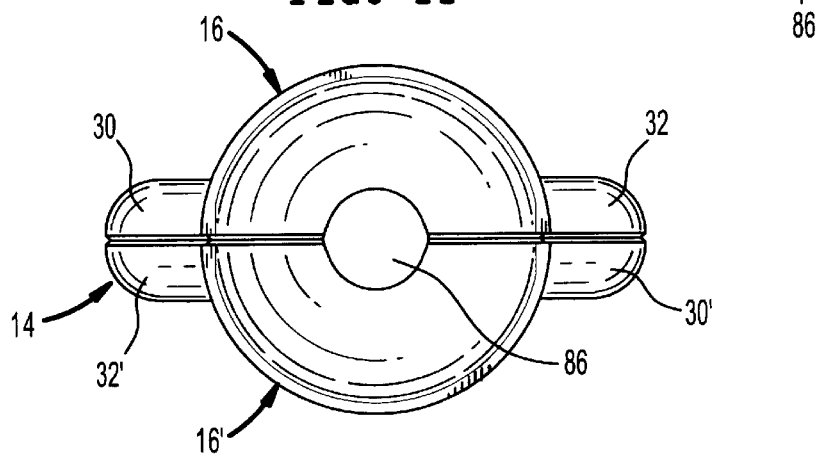

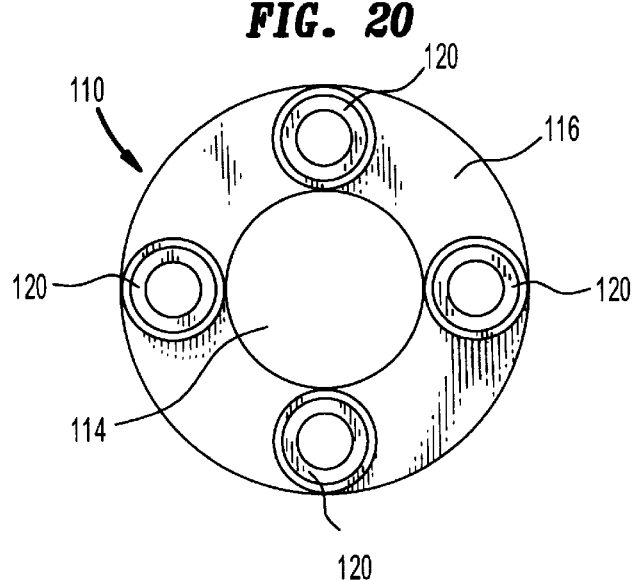
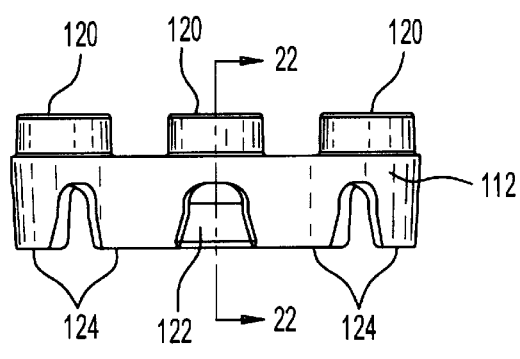
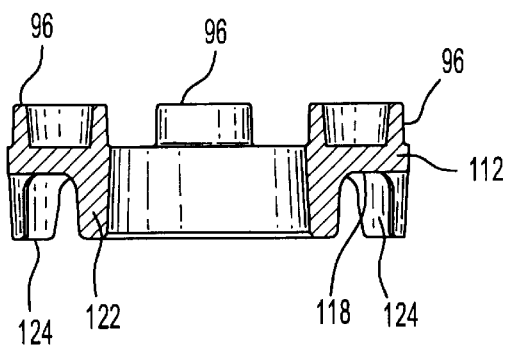
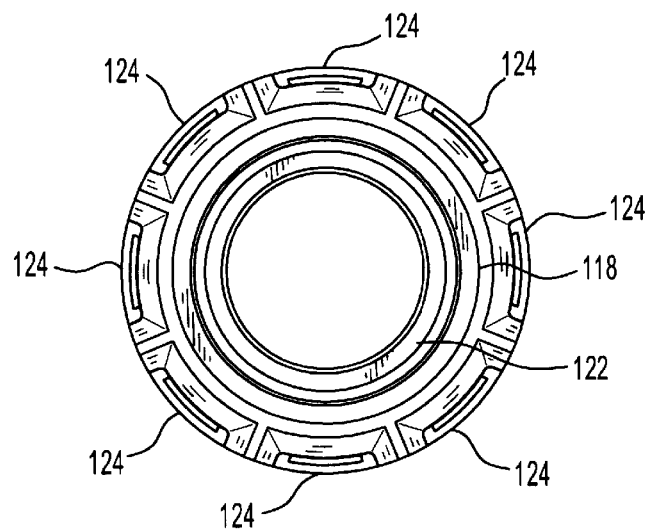

SPIGOT HANDLE EXTENDER

FIELD OF THE INVENTION

The present invention relates to valve handles and more particularly to a device for extending the handle of a spigot.

BACKGROUND OF THE INVENTION

Residential water valves, particularly exterior spigots used for hose connections, typically have valves with relatively small diameter valve handles located in close proximity to an exterior wall or other obstruction. The valve handles on these exterior spigots are usually circular with indentations around the outer circumference to accommodate the fingers of the operator's hand. However, in addition to being small, the valve handles are smooth and slippery when wet. As a result, they are difficult to grip adequately to open or close the valve. Since the valve handles are oftentimes located so very close to an obstruction, slippage can cause abrasion injuries to the operator's hand. These problems are especially difficult for people with reduced or impaired gripping strength, such as some of the elderly or people afflicted with arthritis or other debilitating conditions.

In addition, old valve handles of residential exterior spigots may be difficult to remove after years of exposure to the elements. In addition, the valve handles of some residential exterior spigots, particularly those readily accessible to passersby, must be easily removable to avoid unauthorized use.

For the foregoing reasons, there is a need for an ergonomically designed and easily gripped, non-slip valve handle extender especially suitable for ease of installation and removal on residential spigot valves.

SUMMARY OF THE INVENTION

An apparatus for extending a valve handle includes a rotatable body and engaging means for engaging a valve handle so as to be rotatable conjointly therewith. The engaging means is enclosed within the body and is also rotatable conjointly with the body, so that the engaging means rotates an engaged valve handle in response to the rotation of the body. In a preferred embodiment, the body is formed by identical hermaphroditic body halves with posts and receivers which engage when the body halves are mated together. The body includes a pair of attached opposing wings, a plurality of slots, and a central bore. The engaging means is an engager which includes a base with an opening, a plurality of bosses projecting from one side, and a plurality of fingers projecting from the opposite side. The bosses on the base fit engagingly into slots within the body and the fingers on the base fit engagingly between the spokes of the valve handle when the engager and valve handle are enclosed within the body. The central bore through the body aligns with an opening in the base to allow access to any fastener connecting the valve handle to the valve, allowing removal and replacement of the body and an engaged valve handle as a unit. The body can accommodate interchangeable engagers configured to grip various styles of valve handles, particularly residential spigot handles.

BRIEF DESCRIPTION OF THE DRAWINGS

For a better understanding of the present invention, reference is made to the following detailed description of an exemplary embodiment considered in conjunction with the accompanying drawings, in which:

FIG. 8 is a front elevational view of a body for the spigot handle extender shown in FIG. 1, the rear elevational view being identical thereto;

FIG. 9 is a right side elevational view of the body shown in FIG. 8, the left side elevational view being identical thereto;

FIG. 10 is a top plan view of the body shown in FIG. 8;

FIG. 11 is a bottom plan view of the body shown in FIG. 8;

FIG. 20 is a top plan view of an alternate embodiment of an engager for the spigot handle extender shown in FIG. 1;

FIG. 21 is a side elevational view of the engager shown in FIG. 20;

FIG. 22 is a cross-sectional view, taken along section line 22—22 in FIG. 21 and looking in the direction of the arrows, of the engager shown in FIG. 21;

FIG. 23 is a bottom plan view of the engager shown in FIG. 21;

DETAILED DESCRIPTION OF THE INVENTION

Figure 1:
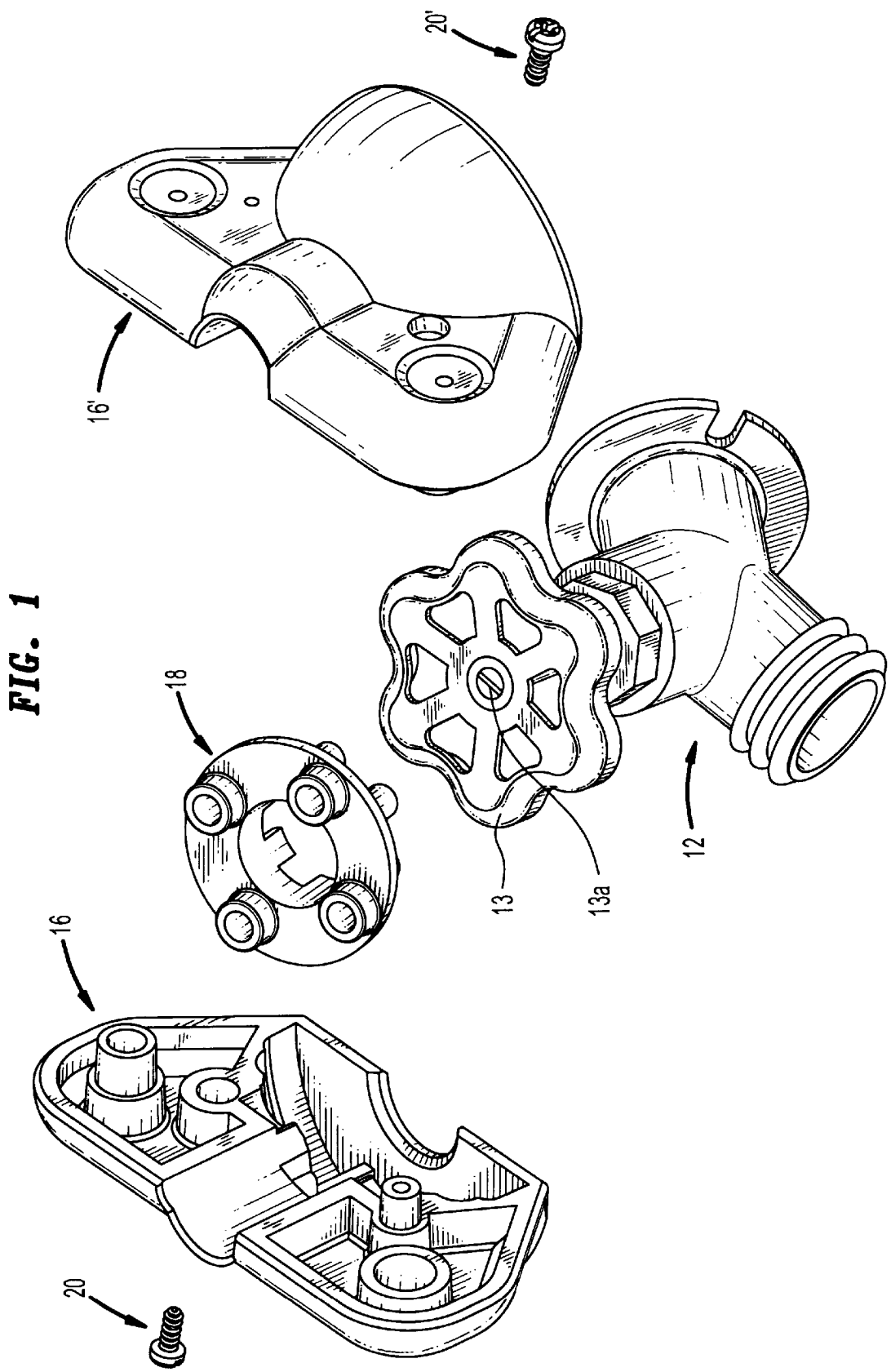
FIG. 1 is an exploded perspective view of an exemplary embodiment of a spigot handle extender constructed in accordance with the present invention and a spigot on which the extender is to be installed.
Figure 2:
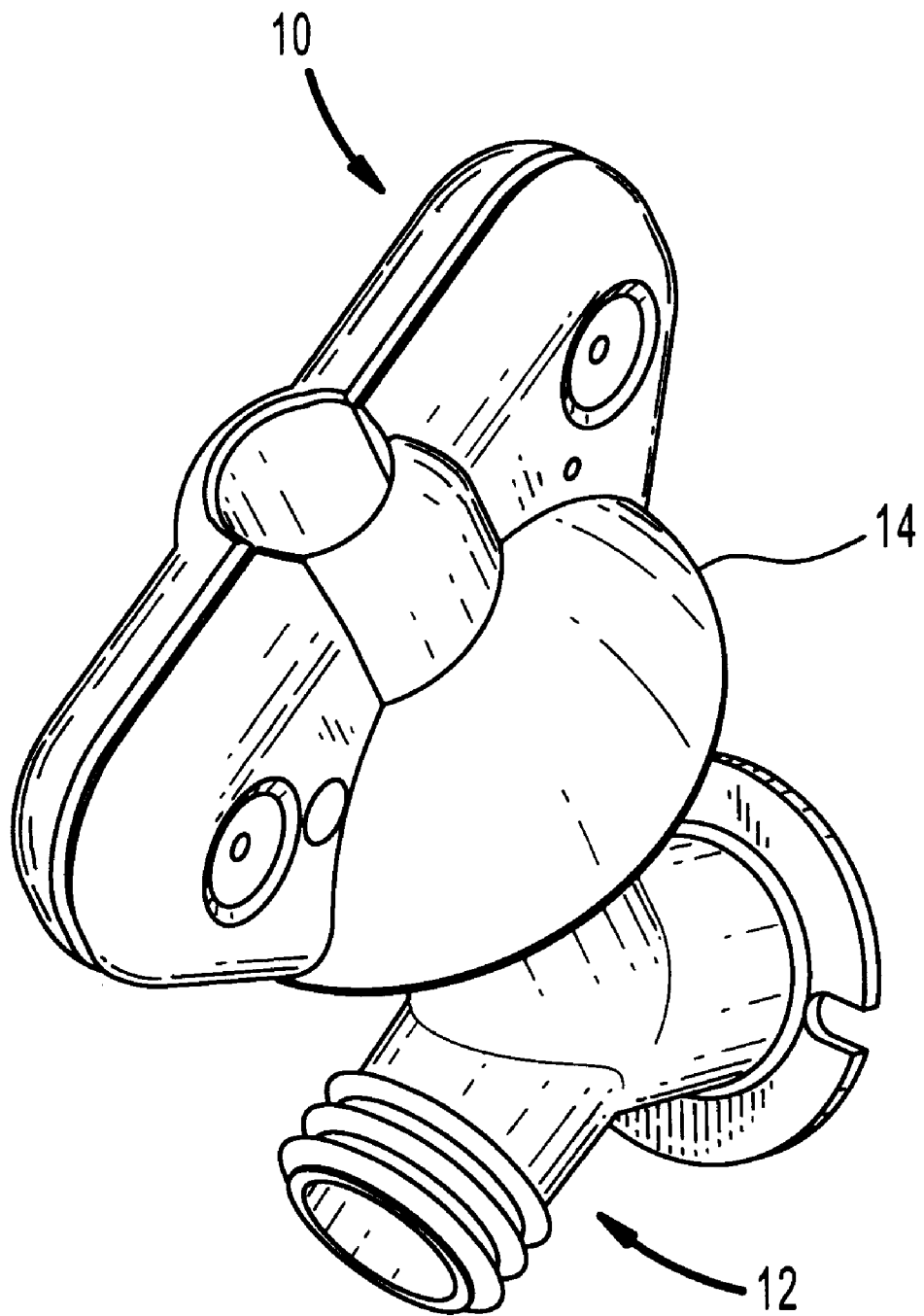
FIG. 2 is a perspective view of the spigot handle extender of FIG. 1 installed on the spigot shown in FIG. 1.

Referring to FIGS. 1 and 2, there is shown a spigot handle extender 10 fitted to a spigot 12 with a spigot handle 13. The spigot handle extender 10 includes a rotatable body 14 with identical body halves 16 and 16', an engager 18 and self-tapping screws 20, 20'. Before discussing each element in detail, it is noted that the exemplary embodiment of the spigot handle extender 10 is based on a design to fit residential type spigot handles, however, the invention is not limited to this particular type of valve handle.

Figure 3:
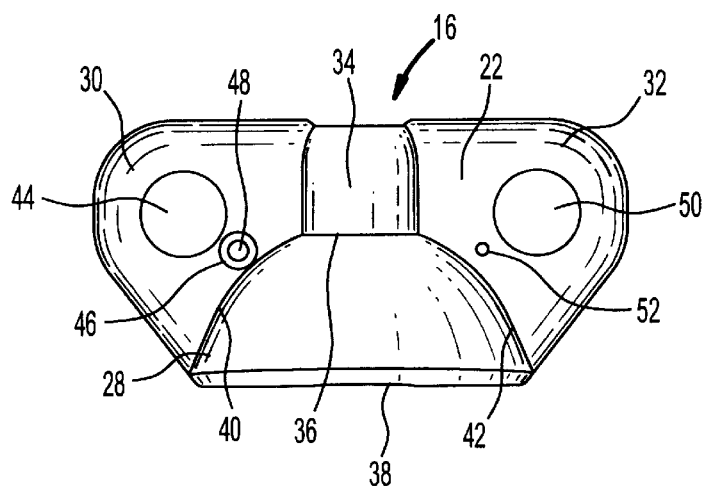
FIG. 3 is a front elevational view of a body half for the spigot handle extender shown in FIG. 1.
Figure 4:
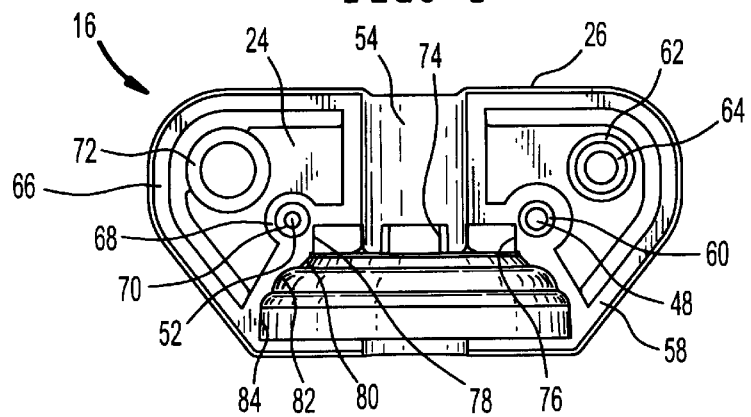
FIG. 4 is a rear elevational view of the body half shown in FIG. 3.
Figure 5:
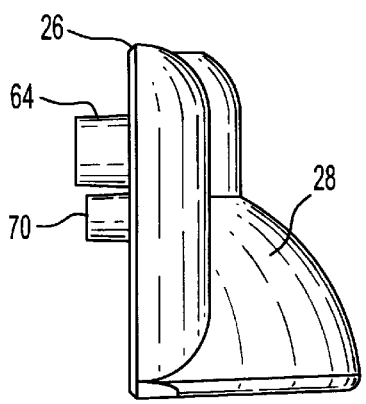
FIG. 5 is a side elevational view of the body half shown in FIG. 4.
Figure 6:
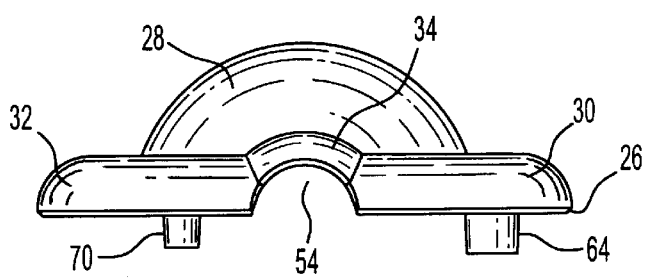
FIG. 6 is a top plan view of the body half shown in FIG. 4.
Figure 7:
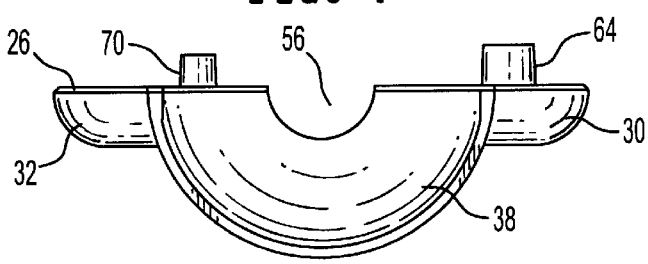
FIG. 7 is a bottom plan view of the body half shown in FIG. 4.
Figure 12:
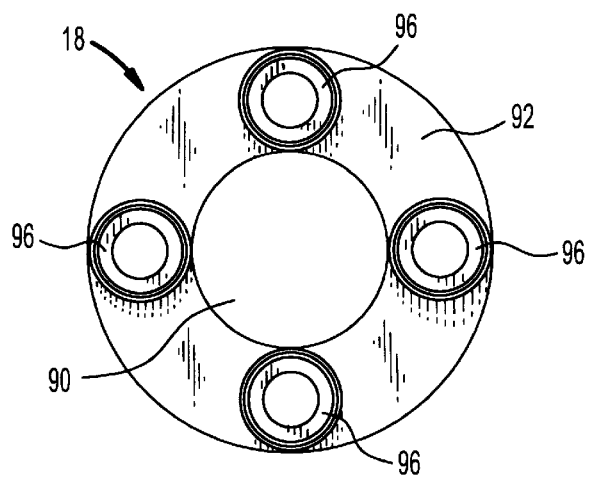
FIG. 12 is a top plan view of an engager for the spigot handle extender shown in FIG. 1.
Figure 13:
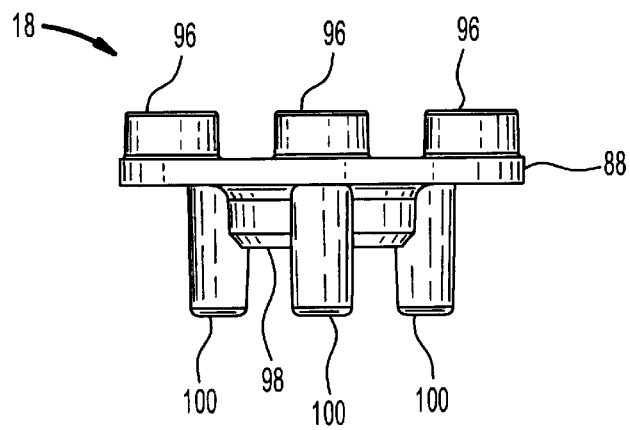
FIG. 13 is a side elevational view of the engager shown in FIG. 12.
Figure 14:
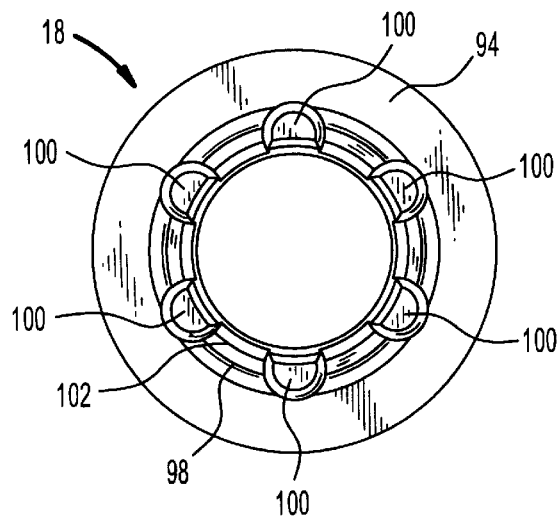
FIG. 14 is a bottom plan view of the engager shown in FIG. 12.
Figure 15:
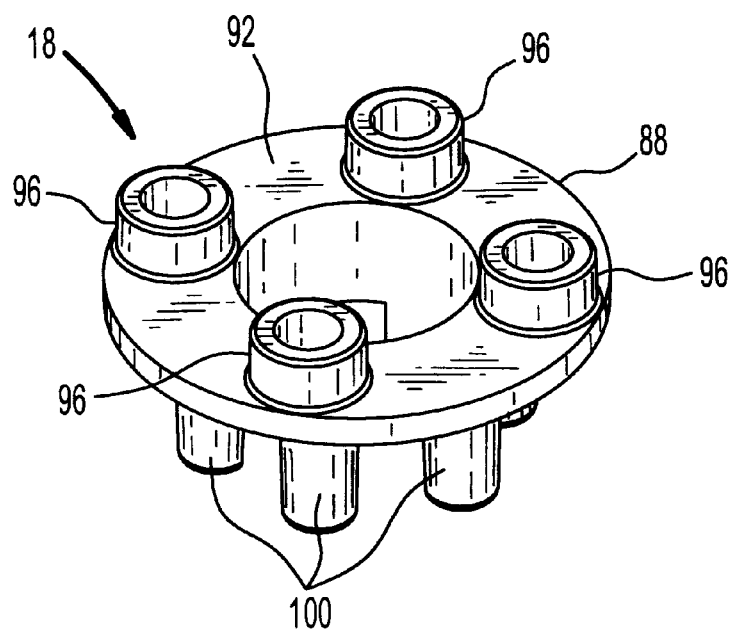
FIG. 15 is a top perspective view of the engager shown in FIG. 12.
Figure 16:
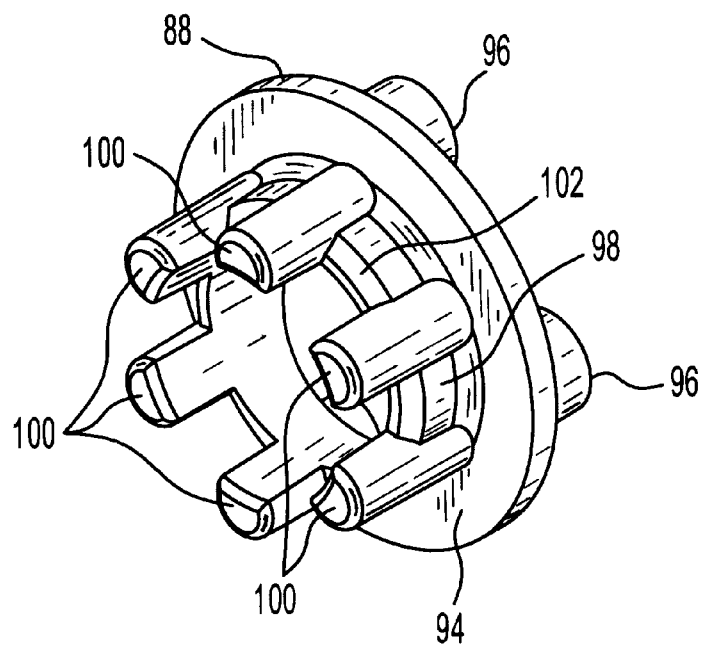
FIG. 16 is a bottom perspective view of the engager shown in FIG. 12.
Figure 17:
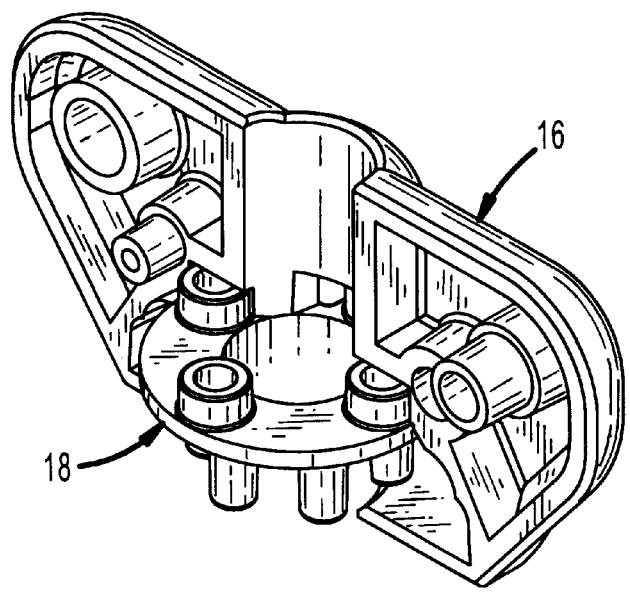
FIG. 17 is a perspective view of the engager of FIGS. 12–16 positioned in the body half of FIGS. 3–7.

Referring now to FIGS. 3–7, in general, and FIGS. 3 and 4, in particular, each body half 16 includes an exterior surface 22 and an interior surface 24 separated generally by a bevelled edge 26. The exterior surface 22 has generally rounded contours to avoid sharp edges. Referring particularly to FIG. 3, each body half 16 also includes a hollow semi-dome 28, a fastener end wing 30, a receiver end wing 32, and a semi-tube 34. The hollow semi-dome 28 includes a top 36, a bottom 38, a fastener end 40 and a receiver end 42. The bottom 38 is angled slightly so that it rises up as it extends away from the bevelled edge 26. The fastener end wing 30 and the receiver end wing 32 are connected to the fastener end 40 and the receiver end 42, respectively, of the hollow semi-dome 28. The fastener end wing 30 includes an indent 44 and a cylindrical recess 46 with a centered aperture 48. Similarly, the receiver end wing 32 also includes an indent 50 and a receiver hole 52. Now with particular reference to FIGS. 6 and 7, the semi-tube 34 is connected to the top 36 of the hollow semi-dome 28, the fastener end wing 30, and the receiver end wing 32. Each body half 16 also includes a top semi-circular bore 54. The bottom 38 also has a bottom semi-circular bore 56 which is aligned with the top semi-circular bore 54.

Referring still to FIGS. 3–7, with particular reference to FIG. 4, the fastener end wing 30 includes a fastener end rib 58 projecting perpendicularly from the interior surface 24. A portion of the fastener end rib 58 forms a cylindrical screw post receiver 60 concentrically located around the centered aperture 48. The fastener end wing 30 also includes a tubular base 62 encircling a tubular locator post 64, both of which project perpendicularly from the interior surface 24. Similarly, the receiver end wing 32 includes a receiver end rib 66 projecting perpendicularly from the interior surface 24. A portion of the receiver end rib 66 forms a screw post base 68 concentrically located around a cylindrical screw post 70. The cylindrical screw post 70 projects perpendicularly from the interior surface 24 around the receiver hole 52. The receiver end wing 32 also includes a tubular locator post receiver 72 which projects perpendicularly from the interior surface 24. The hollow semi-dome 28 includes a semi-circular slot 74, a fastener end arcuate slot 76 and a receiver end arcuate slot 78, all of which project outwardly from the interior surface 24. The interior surface 24 of the hollow semi-dome 28 also includes a top semi-circular rim 80, a middle semi-circular rim 82 and a bottom semi-circular rim 84.

Each body half 16 is generally molded from a polymeric material. An ultraviolet stabilized ABS plastic with a texture finish on the exterior surface 22 to provide for better gripping is preferred. Alternatively, molded or fabricated metals with either smooth or textured finishes may be used.

Referring now to FIGS. 2–4 and 8–11, the body 14 includes two releasably attached body halves 16 and 16' fastened together with self-tapping screws 20 and 20'. In the preferred embodiment, the body halves 16 and 16' are identical and hermaphroditic such that various projections on the interior surfaces 24 and 24' mate engagingly with complementary receiving structures, as described hereinafter. As shown in FIGS. 10 and 11, when the body halves 16 and 16' are mated together to form the body 14, the fastener end wing 30 is aligned with the receiver end wing 32' forming a wing 33 on one end of the body 14 and the receiver end wing 32 is aligned with the fastener end wing 30' forming an identical wing 33' on the opposite end of the body 14. The two wings 33 and 33' are attached on diametrically opposed sides of the body 14 from each other. A first grip portion on wing 33 is formed by indents 44 and 50' and a second grip portion on wing 33' is formed by indents 44' and 50. The first and second grip portions are spaced apart such that the distance between them is greater than the diameter of a valve handle engaged by engaging means.

Reference to FIG. 4 illustrates the interior surface 24 of body half 16 and the associated structures thereupon. An apostrophe designation (') is used to indicate identical structures on the mating interior surface 24' of the body half 16' which are described herein but not separately shown. Accordingly, when the body halves 16 and 16' are mated, the tubular locator post 64 on the fastener end wing 30 fits engagingly within the tubular locator post receiver 72' on the receiver end wing 32'. Similarly, the cylindrical screw post 70' on the receiver end wing 32' fits engagingly within the cylindrical screw post receiver 60 on the fastener end wing 30. The screw 20 is positioned in the centered aperture 48 within the cylindrical recess 46 on the fastener end wing 30 and threadedly engages the receiver hole 52' in the cylindrical screw post 70' on the receiver end wing 32'. Similarly, the screw 20' is positioned in the centered aperture 48' within the cylindrical recess 46' on the fastener end wing 30' and threadedly engages the receiver hole 52 in the cylindrical screw post 70 on the receiver end wing 32, thereby fastening the body halves 16 an 16' together to form the body 14. When the body halves 16 and 16' are fastened together, there is an enclosure in the shape of a hemisphere within the two hollow semi-domes 28 and 28'. In addition, the top semi-circular bore 54 is opposite the top semi-circular bore 54' and the bottom semi-circular bore 56 is opposite the bottom semi-circularbore 56' forming a central bore 86 disposed between the wings 33 and 33' and extending through the body 14.

The preferred fastener is a self-tapping screw 20, 20' in particular, a number 6 aluminum, Phillips and slot combination, type A tapping screw. However, other types of fasteners including machine screws and other types of screws, pins, or complementary locking tabs may be used.

Referring now to FIGS. 12–16, the engager 18 includes a ring base 88 with an opening 90, a top 92 and a bottom 94. The ring base 88 is sized and shaped to fit engagingly against the top semi-circular rim 80 on the body half 16. The engager 18 also includes four tubular bosses 96, a tubular web 98 and six fingers 100. The four tubular bosses 96 are circumferentially spaced on the top 92 and project perpendicularly therefrom. The tubular bosses 96 are sized, shaped and arranged to fit engagingly into the slots 74, 76, 78 on the body half 16. The tubular web 98 projects perpendicularly from the bottom 94, aligned around the opening 90. The tubular web 98 also includes a bevelled outer edge 102. The six fingers 100 also project perpendicularly from the bottom 94 and are connected to the tubular web 98.

The engager 18 is also generally molded from a polymeric material. An ultraviolet stabilized, low wear, low friction, acetal plastic is preferred. Alternatively, molded or fabricated metals may be used.

Referring now to FIGS. 4, 10, 13 and 17, the engager 18 connects within the hollow semi-dome 28 of the body half 16 such that when any one of the tubular bosses 96 is positioned within the semi-circular slot 74, the adjacent tubular bosses 96 are positioned in the fastener end arcuate slot 76 and the receiver end arcuate slot 78, and the ring base 88 is positioned against the top semi-circular rim 80. When two body halves 16 and 16' are mated together to form the body 14, as shown in FIG. 10 and described above, the engager 18 is fully enclosed within the body 14 with one tubular boss 96 positioned within the semicircular slot 74, the opposite tubular boss 96 positioned within the semicircular slot 74', and the remaining tubular bosses 96 positioned within slots formed by the juxtaposition of the fastener end arcuate slot 76 to the receiver end arcuate slot 78' and the juxtaposition of the receiver end arcuate slot 78 to the fastener end arcuate slot 76'. In addition, the ring base 88 of the engager 18 is positioned between the two top semi-circular rims 80 and 80' within the body 14. When the engager 18 is positioned within the body 14, the opening 90 of the engager 18 aligns with the central bore 86 of the body 14. Although four bosses 96 and four slots are described, a single boss in a single slot could be utilized.

Figure 18:
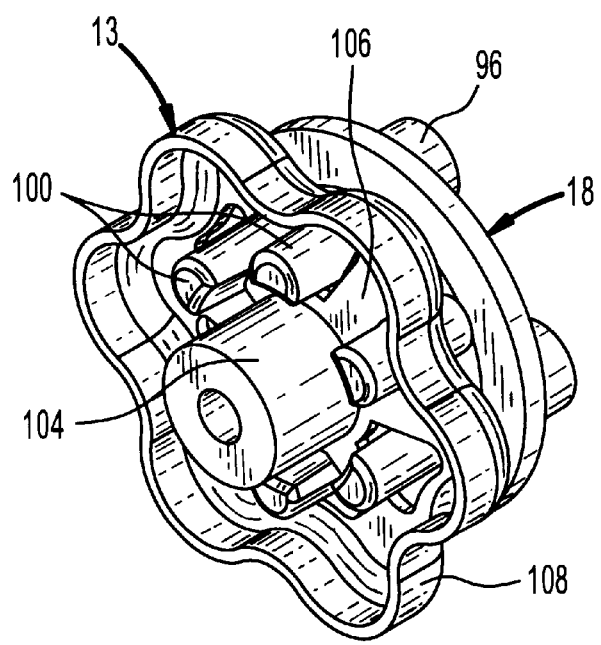
FIG. 18 is a perspective view of the engager of FIGS. 12–16 installed on the spigot handle shown in FIG. 1.
Figure 19:
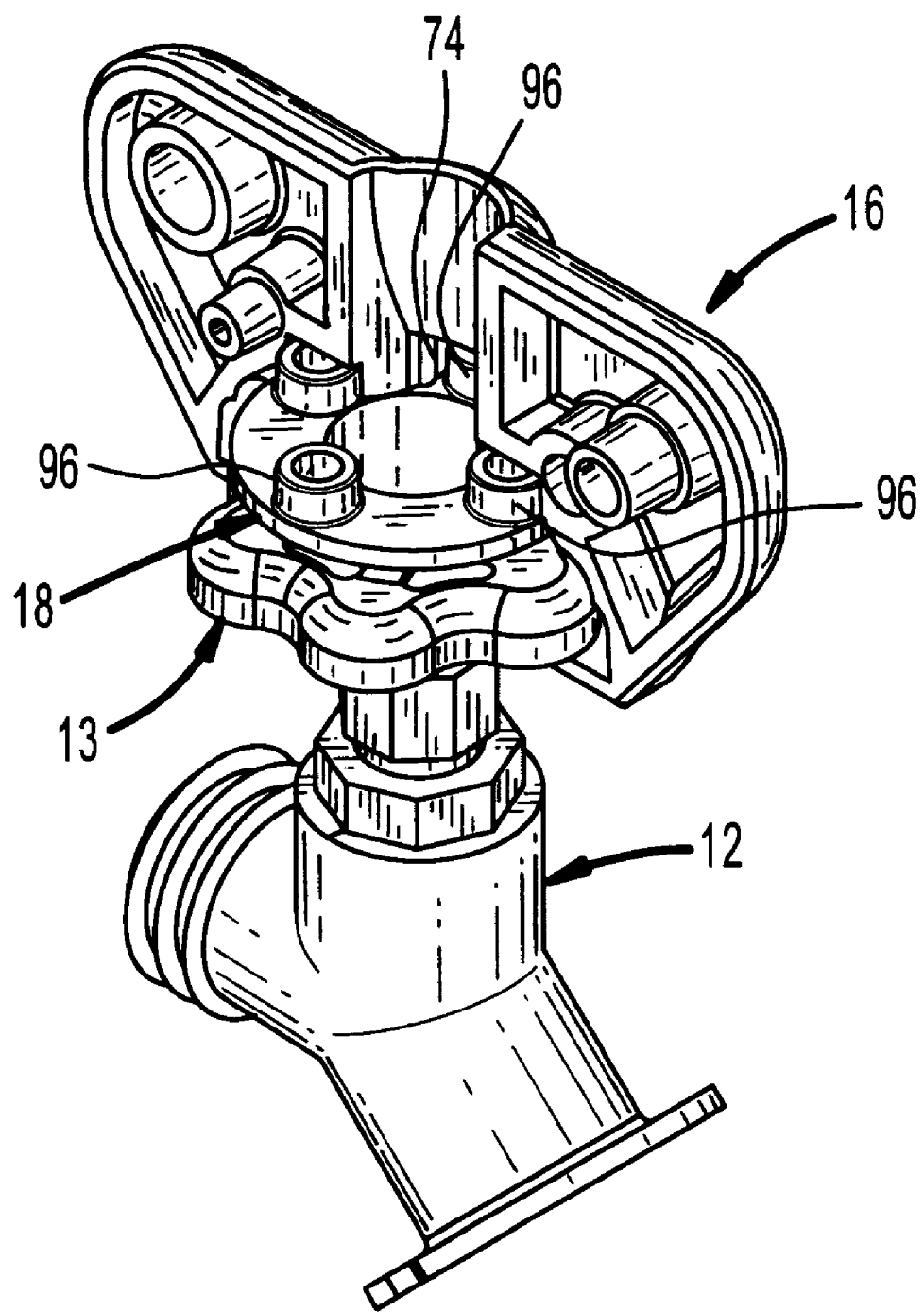
FIG. 19 is a perspective view similar to FIG. 17, except that the engager has been installed on the spigot shown in FIG. 1.
Figure 24:
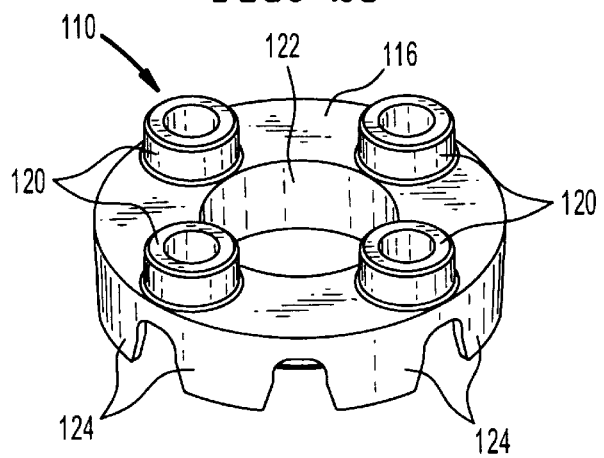
FIG. 24 is a top perspective view of the engager shown in FIG. 21.
Figure 25:
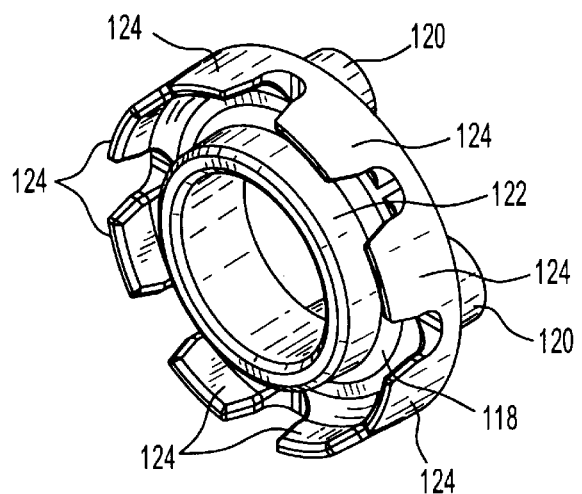
FIG. 25 is a bottom perspective view of the engager shown in FIG. 21.

Referring now to FIGS. 2 and 18, the spigot handle 13 includes a hub 104, six spokes 106 and an outer rim 108. The spokes 106 radiate outwardly from the hub 104 to the outer rim 108 and are equidistantly spaced therebetween. When the engager 18 engages the spigot handle 13, which is depicted as removed from the spigot 12 in FIG. 18, the six fingers 100 of the engager 18 pass through the spaces formed between the six spokes 106 of the spigot handle 13 with the tubular web 98 positioned above the spokes 106. Although six fingers 100 are described, one finger 100 fitting engagingly between a corresponding pair of spokes 106 could be utilized.

Referring now to FIGS. 1, 2, 4, 7 and 19, the assembly of the spigot handle extender 10 on the spigot 12 is performed as follows. First, with particular reference to FIG. 19, the engager 18 engages the spigot handle 13, attached to the spigot 12, with the fingers 100 inserted between the spokes 106 as described above. Next, one body half 16 is slid on the spigot handle 13 and engager 18 sub-assembly such that, when the spigot handle 13 and the engager 18 are positioned within the hollow semi-dome 28, one of the tubular bosses 96 is positioned within the semi-circular slot 74 and the hub 104 of the spigot handle 13 is positioned in the bottom semi-circular bore 56 (not shown). Once one of the tubular bosses 96 is positioned within the semi-circular slot 74, the adjacent tubular bosses 96 are positioned in the fastener end arcuate slot 76 and the receiver end arcuate slot 78, and the ring base 88 is positioned against the top semi-circular rim 80. To complete the assembly of the spigot handle extender 10 on the spigot 12, the second body half 16' is similarly slid on the spigot handle 13 and engager 18 sub-assembly and mated and fastened to the first body half 16 with self-tapping screws 20, 20'.

When the two body halves 16 and 16' are mated together, as previously described, to form the body 14, the engager 18 and spigot handle 13 are substantially enclosed within the body 14 such that one tubular boss 96 is positioned within the semicircular slot 74, the opposite tubular boss 96 is positioned within the semicircular slot 74', and the remaining tubular bosses 96 are positioned within slots formed by the juxtaposition of the fastener end arcuate slot 76 to the receiver end arcuate slot 78' and the juxtaposition of the receiver end arcuate slot 78 to the fastener end arcuate slot 76'. In addition, the ring base 88 of the engager 18 is positioned between the two top semi-circular rims 80 and 80' within the body 14. When the engager 18 and spigot handle 13 are positioned within the body 14, the hub 104 of the spigot handle 13 extends through the bottom of the central bore 86 formed by the bottom semi-circular bores 56 and 56' and the opening 90 of the engager 18 aligns with the top of the central bore 86 of the body 14, allowing access to any fastener 13a located in the center of the spigot handle 13 and attaching the spigot handle 13 to the valve stem of the spigot 12. The fastener 13a may be unfastened while the body 14 and the spigot handle 13 are engaged so that the spigot handle 13 can be removed from an associated valve stem without disengaging the body from the spigot handle 13. The spigot handle 13 and the body 14 are removable and replaceable as a unit. In the preferred embodiment, the spigot handle extender 10 can accommodate a spigot handle 13 with a maximum diameter of 2.3 inches.

The engager 18 is removably received within the body such that the engager 18 can be removed and replaced with another engager. Another engager may be identical to the engager 18 or may be different than the engager 18.

In operation, the spigot handle extender 10 enables a user to increase the amount of torque applied to the spigot handle 13 with the same amount of force. This increased leverage is accomplished by using the body 14 to increase the diameter of the moment arm through which the force is applied and by transmitting that increased torque through the body 14 and the engager 18 to the spigot handle 13. The ergonomic design of the body 14 enables a user to grip the wings 33 and 33' so that the user's thumb and fingers naturally fall on the first grip portion 44, 50' and the second grip portion 44', 50. The textured exterior surface 22 of the body 14 helps to prevent the user's grip from slipping, thereby reducing the abrasion risk to the user's hand. The torque applied through the wings 33 and 33' is transmitted through the slots 74, 74', 76 and 78', and 76' and 78 in the body 14 to the engager 18 via the tubular bosses 96. The torque is then transmitted via the fingers 100 of the engager 18 to the spokes 106 of the spigot handle 13, causing the spigot handle 13 to turn and thereby either opening or closing the spigot 12, depending on the direction of the torque applied.

It should be noted that the spigot handle extender 10 can be assembled on the handle 13 of a spigot 12 without removing the handle 13 from the spigot 12, as described above. Alternatively, the spigot handle extender 10 can be assembled on the spigot handle 13 before it is applied to the spigot 12 and, then, the assembly, including the spigot handle 13 and spigot handle extender 10, can be installed on the spigot 12. The central bore 86 of the body 14 provides access to the fastener 13a in the center of the spigot handle 13 within the spigot handle extender 10, thereby facilitating installation or removal of the assembled spigot handle 13 and spigot handle extender 10.

Referring now to FIGS. 20–25, an alternate embodiment of the spigot handle extender 10 includes an alternate engager 110 with a ring base 112 and an opening 114, a top 116 and a bottom 118. The ring base 112 is also sized and shaped to fit engagingly against the top semi-circular rim 80 on the body half 16. The alternate engager 110 also includes four tubular bosses 120, an inner tubular positioner 122 and eight outer fingers 124. The four tubular bosses 120 are circumferentially spaced on the top 116 and project perpendicularly therefrom. The tubular bosses 120 are sized, shaped and arranged to fit engagingly into the slots 74, 76, 78 on the body half 16. The inner tubular positioner 122 projects perpendicularly from the bottom 118 and is aligned around the opening 114. The eight outer fingers 124 also project perpendicularly from the bottom 118 and are circumferentially spaced around the outside edge of the ring base 112.

Figure 26:
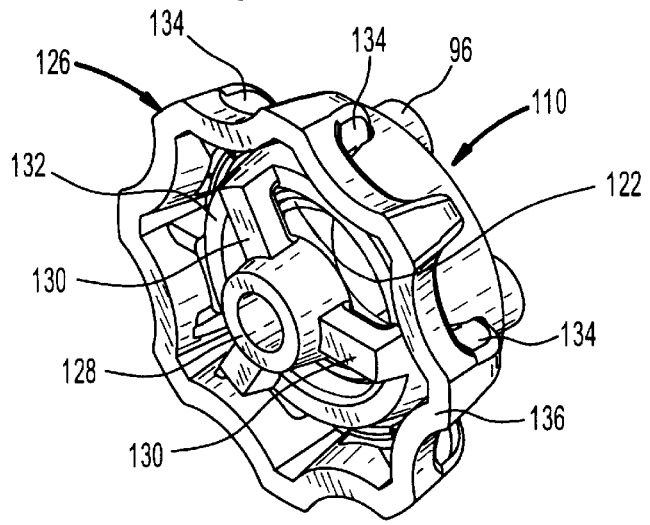
FIG. 26 is a perspective view of the engager of FIGS. 20–25 installed on a spigot handle different than the one shown in FIG. 1.
Figure 27:
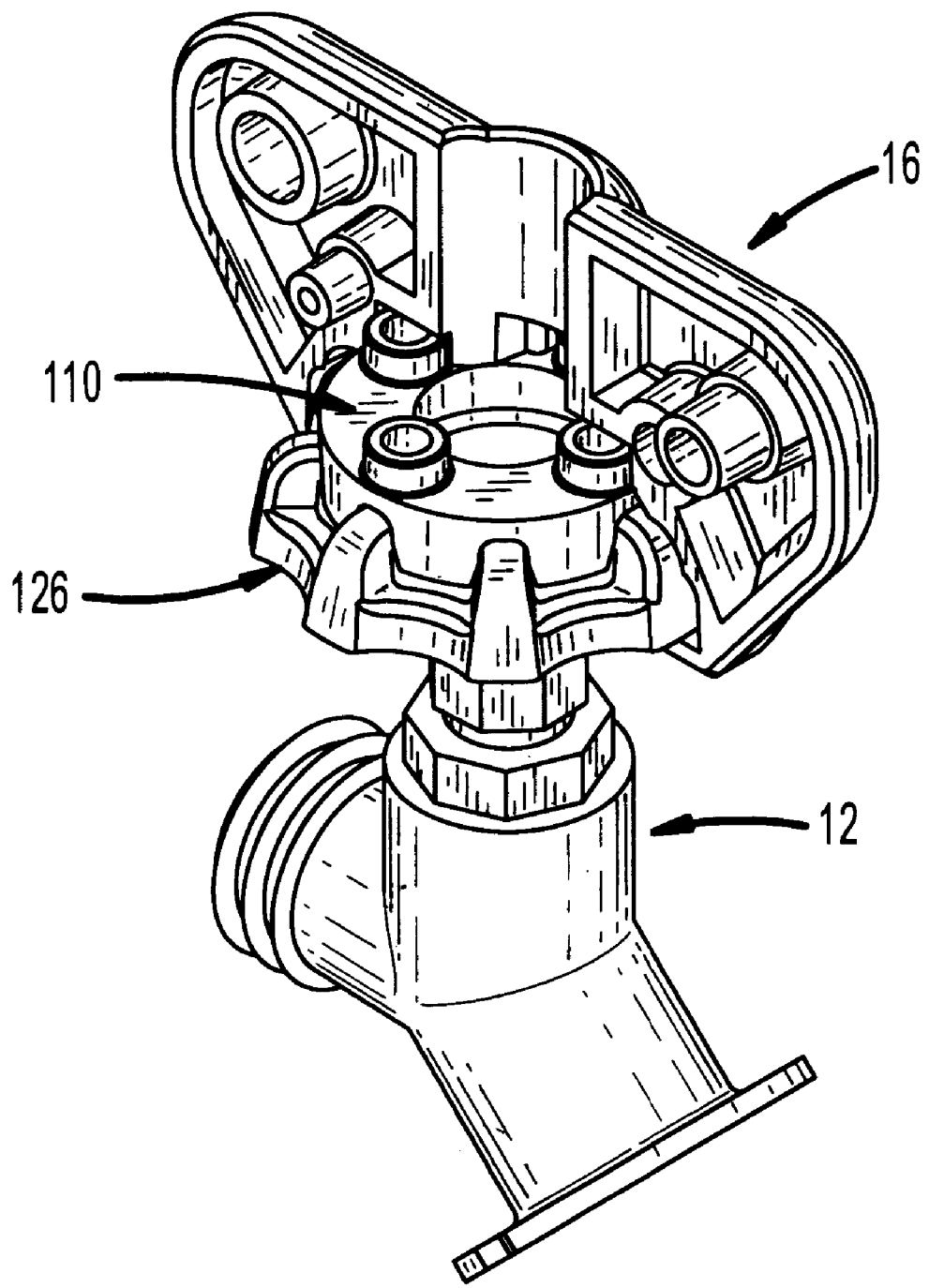
FIG. 27 is a perspective view similar to FIG. 19, except that it shows the engager of FIGS. 20–25 and the spigot handle of FIG. 26 applied to the body half of FIGS. 3–7 and the spigot of FIG. 1.

Referring now to FIGS. 26 and 27, the alternate engager 110 mates with an alternate spigot handle 126 which includes a hub 128, three inner spokes 130 and an inner rim 132. The inner spokes 130 radiate outwardly from the hub 128 to the inner rim 132 and are equidistantly spaced therebetween. The alternate spigot handle 126 also includes eight outer spokes 134 and an outer rim 136. The outer spokes 134 radiate outwardly between the inner rim 132 and the outer rim 136 and are equidistantly spaced therebetween. When the alternate engager 110 engages the alternate spigot handle 126, which is depicted as removed from the spigot 12 in FIG. 26, the inner tubular positioner 122 is positioned inside the inner rim 132 and the eight outer fingers 124 of the alternate engager 110 pass through the spaces formed between the eight outer spokes 134, the inner rim 132 and the outer rim 136 of the alternate spigot handle 126. With particular reference to FIG. 27, the spigot handle extender 10 is assembled and operated with the alternate engager 110 engaging the alternate spigot handle 126 on the spigot 12 in the same manner as described above for the assembly and operation of the spigot handle extender 10 with the engager 18 engaging the spigot handle 13 on the spigot 12.

The alternate engager 110 is interchangeable with the engager 18 to enable installation of the spigot handle extender 10 on the alternate spigot handle 126. Many other interchangeable variations of engager 18 may be developed to accommodate variations of spigot handle 13 within the spigot handle extender 10.

Figure 28:
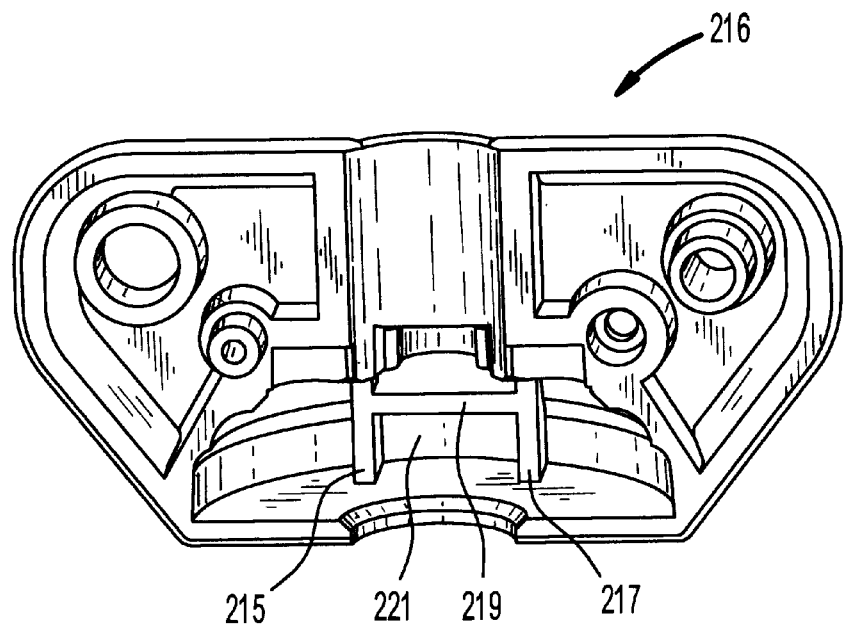
FIG. 28 is a perspective view of a first alternate embodiment of the body half shown in FIGS. 3–7.
Figure 29:
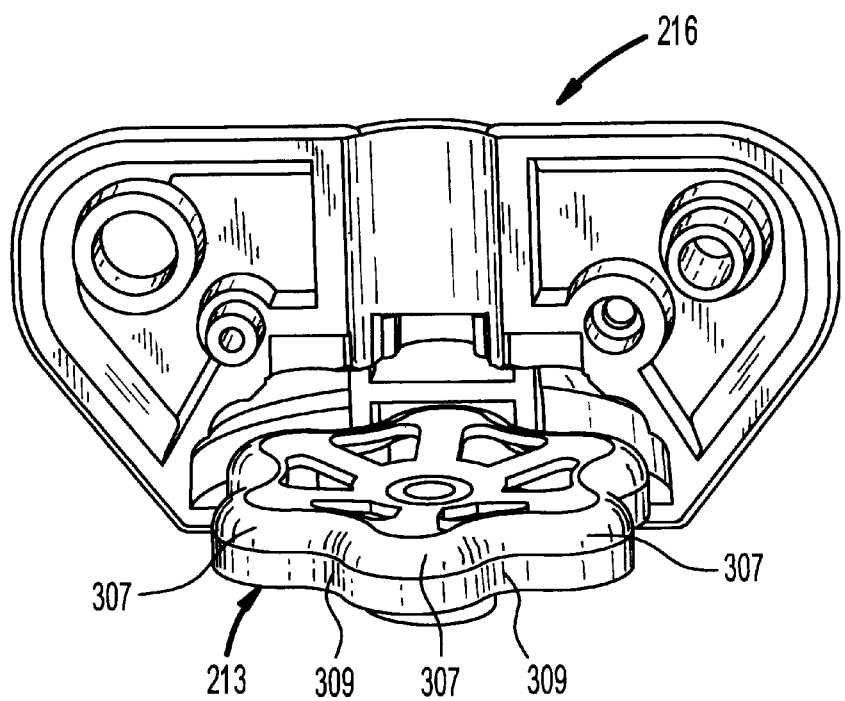
FIG. 29 is a perspective view of the body half of FIG. 28 applied to a spigot handle similar to the one shown in FIG. 1.

Other alternate embodiments of the spigot handle extender 10 include an integrally molded portion of the body 14 to eliminate a separate engager 18. Referring now to FIGS. 28 and 29, one such alternate embodiment is a spigot handle extender 210 with a body 214 which includes all of the features of the exemplary embodiment of the body 14 with the reference numbers increased by 200. With particular reference to FIG. 28, each body half 216 includes ribs 215 and 217 with a plate 219 therebetween, forming an indentation in the form of a pocket 221 within the hollow semi-dome 228.

Now with particular reference to FIG. 29, the spigot handle 213 includes alternating protrusions 307 and indentations 309 around the outer rim 308. The body half 216 fits matingly with the spigot handle 213 so that when one of the protrusions 307 is positioned in the pocket 221, the ribs 215 and 217 engage the adjacent indentations 309 on the outer rim 308. Although this arrangement is preferred to accommodate spigot handles with six protrusions, it may accommodate spigot handles with one or more protrusions.

When the two body halves 216 and 216' are mated together to form the body 214, the spigot handle 213 is fully enclosed within the body 214 such that one protrusion 307 is positioned within the pocket 221 with the ribs 215 and 217 engaging adjacent indentations 309 and the opposite protrusion 307 is positioned within the pocket 221' with the ribs 215' and 217' engaging indentations 309. When the spigot handle 213 is positioned within the body 214, the hub 304 of the spigot handle 213 extends through the bottom of the central bore 286 and aligns with the top of the central bore 286 of the body 214, allowing access to any fastener in the center of the spigot handle 213. When the spigot handle extender 210 is fitted on the spigot 212, the torque applied through the wings 233 and 233' is transmitted through the ribs 215, 217 and 215', 217' in the body 214 to the outer rim 308 of the spigot handle 213, causing the spigot handle 213 to turn and thereby either opening or closing the spigot 212, depending on the direction of the torque applied.

Figure 30:
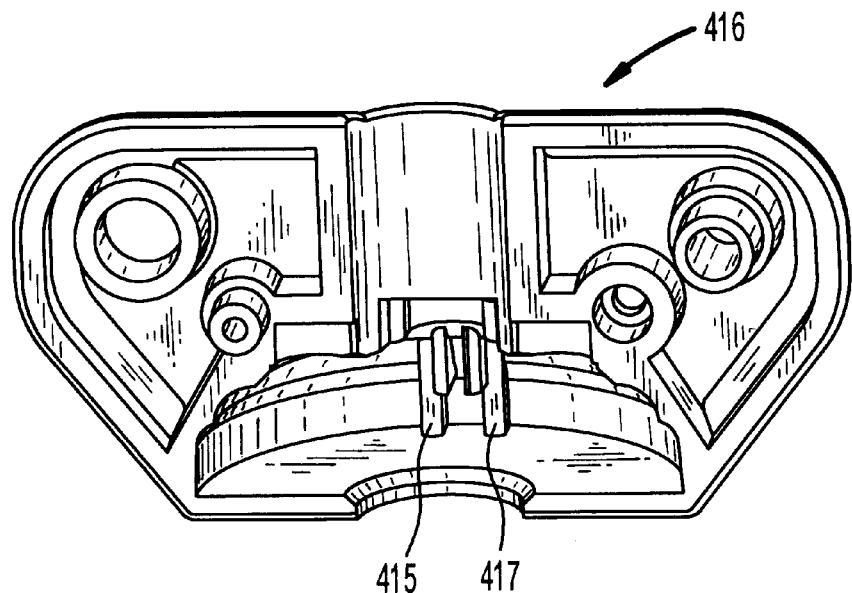
FIG. 30 is a perspective view of a second alternate embodiment of the body half of FIG. 28 applied to a spigot handle similar to the one shown in FIG. 27.
Figure 31:
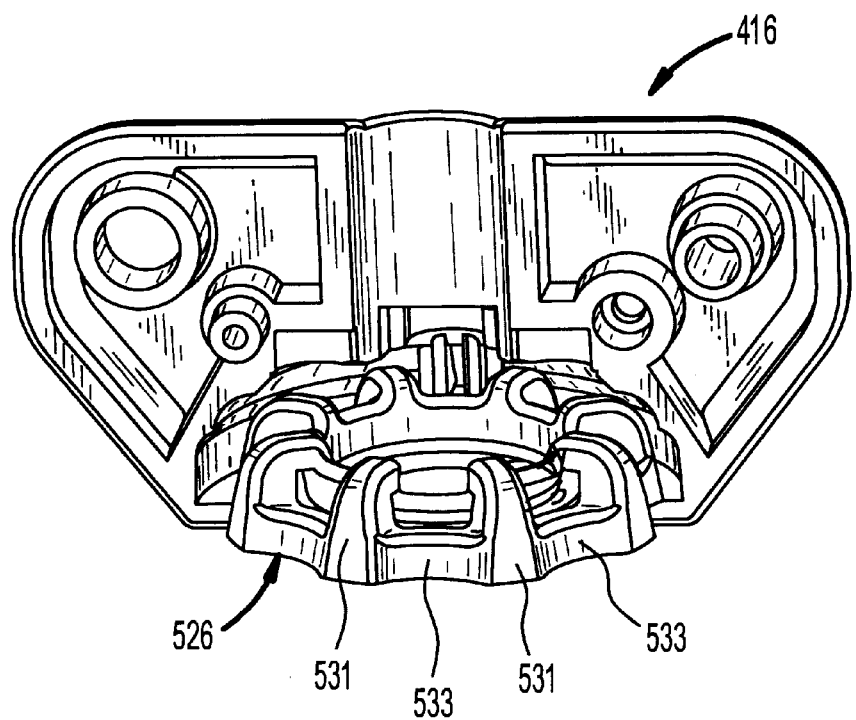
FIG. 31 is a perspective view of the body half of FIG. 30 applied to a spigot handle similar to the one shown in FIGS. 26 and 27.

Referring now to FIGS. 30 and 31, another such alternate embodiment is a spigot handle extender 410 with a body 414 which includes all of the features of the exemplary embodiment of the body 14 with the reference numbers increased by 400. With particular reference to FIG. 30, each body half 416 includes protrusions in the form of finger tabs 415 and 417 within the hollow semi-dome 428.

Now with particular reference to FIG. 31, the alternate spigot handle 526 includes alternating protrusions 531 and indentations 533 around the inner rim 532 and the outer rim 536. The body half 416 fits matingly with the alternate spigot handle 526 so that when the finger tabs 415 and 417 are positioned in one of the indentations 533 between two protrusions 531, the finger tabs 415 and 417 engage the indentation 533 on both the inner rim 532 and the outer rim 536. Although this arrangement is preferred to accommodate spigot handles with eight protrusions, it may accommodate spigot handles with two or more protrusions.

When the two body halves 416 and 416' are mated together to form the body 414, the spigot handle 526 is fully enclosed within the body 414 such that finger tabs 415 and 417 are positioned in one indentation 533 and finger tabs 415' and 417' are positioned in the opposite indentation 533. When the spigot handle 526 is positioned within the body 414, the hub 528 of the alternate spigot handle 526 extends through the bottom of the central bore 486 and aligns with the top of the central bore 486 of the body 414, allowing access to any fastener in the center of the spigot handle 526. When the spigot handle extender 410 is fitted on the spigot 412, the torque applied through the wings 433 and 433' is transmitted through the finger tabs 415, 417 and 415', 417' in the body 414 to the adjacent protrusions 531 of the spigot handle 526, causing the spigot handle 526 to turn and thereby either opening or closing the spigot 412, depending on the direction of the torque applied.

It should be noted that the embodiments described herein are merely exemplary and that a person skilled in the art may make many variations and modifications without departing from the spirit and scope of the invention. For example, in other alternate embodiments of a spigot handle extender, the interior of the body may be molded to conform to a particular spigot handle (not shown). All such embodiments fall within the scope of the invention.

I claim:

1. Apparatus for extending a valve handle, comprising a rotatable body and engaging means for engaging a valve handle so as to be rotatable conjointly therewith, said engaging means being enclosed within said body and being rotatable conjointly therewith, whereby said engaging means rotates an engaged valve handle in response to the rotation of said body, said body being sized and shaped so as to substantially enclose a valve handle engaged by said engaging means, said body including torquing means for applying torque to said body to thereby facilitate its rotation, said torquing means including a plurality of wings attached to said body with one wing connected to said body opposite another wing, said one wing including a first grip portion and said another wing including a second grip portion, said first and second grip portions being spaced apart such that the distance between said first grip portion and said second grip portion is greater than the diameter of a valve handle engaged by said engaging means.

2. Apparatus according to claim 1, wherein said body includes two releasably attached body halves, each said body half being identical and hermaphroditic.

3. Apparatus according to claim 2, wherein said plurality of wings consists of a pair of wings mounted on diametrically opposed sides of said body from each other.

4. Apparatus according to claim 2, wherein each said body half includes a post and a receiver, said post of one of said body halves fitting engagingly into said receiver of the other of said body halves when said body halves are mated together.

5. Apparatus according to claim 2, wherein said engaging means includes an engager, first connecting means for connecting said engager to said body, and second connecting means for connecting said engager to a valve handle.

6. Apparatus according to claim 5, wherein said engager is removably received within said body such that said engager can be removed and replaced with another engager.

7. Apparatus according to claim 6, wherein said another engager is identical to said engager.

8. Apparatus according to claim 6, wherein said another engager is different than said engager.

9. Apparatus according to claim 6, wherein said body includes at least one slot; said engager includes a base; and said first connecting means includes at least one boss projecting from said base, said at least one boss fitting engagingly within said at least one slot.

10. Apparatus according to claim 9, wherein said second connecting means includes at least one finger projecting from said base, said at least one finger fitting engagingly between spokes of a valve handle.

11. Apparatus according to claim 10, wherein said at least one slot includes a plurality of slots; and said at least one boss includes a plurality of bosses, each boss of said plurality of bosses fitting engagingly within a corresponding one of said plurality of slots.

12. Apparatus according to claim 11, wherein said at least one finger includes a plurality of fingers, each finger of said plurality of fingers fitting engagingly between a corresponding pair of spokes of a valve handle engaged by said engager.

13. Apparatus according to claim 12, wherein said engager includes six fingers and said another engager includes eight fingers.

14. Apparatus according to claim 12, wherein said base of said engager includes an opening; and said body includes a central bore disposed between said wings and extending through said body in alignment with said opening in said base.

15. Apparatus for extending a valve handle, comprising a rotatable body and engaging means for engaging a valve handle so as to be rotatable conjointly therewith, said body being sized and shaped so as to substantially enclose a valve handle engaged by said engaging means, said engaging means including an integrally molded portion of said body, and said engaging means being enclosed within said body and being rotatable conjointly therewith, whereby said engaging means rotates an engaged valve handle in response to the rotation of said body.

16. Apparatus according to claim 15, wherein said engaging means includes at least one protrusion extending from said body and engaging at least one indentation in a valve handle engaged by said engaging means.

17. Apparatus according to claim 15, wherein said engaging means includes at least one indentation provided in said body and engaging at least one protrusion of a valve handle engaged by said engaging means.

18. Apparatus according to claim 15, wherein said engaging means includes an engager, first connecting means for connecting said engager to said body, and second connecting means for connecting said engager to a valve handle.

19. Apparatus according to claim 15, wherein said body includes two releasably attached body halves, each said body half being identical and hermaphroditic.

20. Apparatus according to claim 9, wherein each said body half includes a post and a receiver, said post of one of said body halves fitting engagingly into said receiver of the other of said body halves when said body halves are mated together.

21. Apparatus for extending a valve handle, comprising a rotatable body and engaging means for engaging a valve handle so as to be rotatable conjointly therewith, said engaging means being enclosed within said body and being rotatable conjointly therewith, whereby said engaging means rotates an engaged valve handle in response to the rotation of said body, said body including accessing means for accessing a fastener securing an engaged valve handle to a valve stem, whereby the fastener may be unfastened while said body and valve handle are engaged.

22. Apparatus according to claim 21, wherein said accessing means includes a central bore extending through said body.

23. Apparatus according to claim 22, wherein said body is sized and shaped so as to substantially enclose a valve handle engaged by said engaging means, whereby the valve handle can be removed from an associated valve stem without disengaging said body from the valve handle.

24. Apparatus according to claim 23, wherein the valve handle and said body are removable and replaceable as a unit.

25. Apparatus according to claim 21, wherein said body is sized and shaped so as to substantially enclose a valve handle engaged by said engaging means.

26. Apparatus according to claim 21, wherein said engaging means includes an engager, first connecting means for connecting said engager to said body, and second connecting means for connecting said engager to a valve handle.

27. Apparatus according to claim 21, wherein said body includes two releasably attached body halves, each said body half being identical and hermaphroditic.

28. Apparatus according to claim 27, wherein each said body half includes a post and a receiver, said post of one of said body halves fitting engagingly into said receiver of the other of said body halves when said body halves are mated together.

29. Apparatus for extending a valve handle, comprising a rotatable body and engaging means for engaging a valve handle so as to be rotatable conjointly therewith, said body being sized and shaped so as to substantially enclose a valve handle engaged by said engaging means, said engaging means being enclosed within said body and being rotatable conjointly therewith, whereby said engaging means rotates an engaged valve handle in response to the rotation of said body, said engaging means including an engager, first connecting means for connecting said engager to said body and second connecting means for connecting said engager to a valve handle, said engager being removably received within said body such that said engager can be removed and replaced with another engager which is different than said engager.

30. Apparatus according to claim 29, wherein said body includes two releasably attached body halves, each said body half being identical and hermaphroditic.

31. Apparatus according to claim 30, wherein each said body half includes a post and a receiver, said post of one of said body halves fitting engagingly into said receiver of the other of said body halves when said body halves are mated together.

32. Apparatus for extending a valve handle, comprising a rotatable body and engaging means for engaging a valve handle so as to be rotatable conjointly therewith, said body including at least one slot and being sized and shaped so as to substantially enclose a valve handle engaged by said engaging means, said engaging means being enclosed within said body and being rotatable conjointly therewith, whereby said engaging means rotates an engaged valve handle in response to the rotation of said body, said engaging means including an engager, first connecting means for connecting said engager to said body and second connecting means for connecting said engager to a valve handle, said engager including a base and being removably received within said body such that said engager can be removed and replaced with another engager, said first connecting means including at least one boss projecting from said base of said engager, said at least one boss fitting engagingly within said at least one slot of said body.

33. Apparatus according to claim 32, wherein said second connecting means includes at least one finger projecting from said base, said at least one finger fitting engagingly between spokes of a valve handle.

34. Apparatus according to claim 33, wherein said at least one slot includes a plurality of slots; and said at least one boss includes a plurality of bosses, each boss of said plurality of bosses fitting engagingly within a corresponding one of said plurality of slots.

35. Apparatus according to claim 34, wherein said at least one finger includes a plurality of fingers, each finger of said plurality of fingers fitting engagingly between a corresponding pair of spokes of a valve handle engaged by said engager.

36. Apparatus according to claim 35, wherein said engager includes six fingers and said another engager includes eight fingers.

37. Apparatus according to claim 35, wherein said base of said engager includes an opening; and said body includes a central bore disposed between said wings and extending through said body in alignment with said opening in said base.

38. Apparatus according to claim 32, wherein said body includes two releasably attached body halves, each said body half being identical and hermaphroditic.

* * * * *